United States Patent [19]

Lupke

[11] Patent Number: 5,429,398
[45] Date of Patent: Jul. 4, 1995

[54] COUPLING FOR RIBBED PIPE

[76] Inventor: Stefan A. Lupke, 10 McLeary Ct., Concord, Ontario, Canada, L4K 2Z3

[21] Appl. No.: 78,193
[22] PCT Filed: Jun. 14, 1991
[86] PCT No.: PCT/CA91/00215
 § 371 Date: Jul. 22, 1993
 § 102(e) Date: Jul. 22, 1993
[87] PCT Pub. No.: WO92/11485
 PCT Pub. Date: Jul. 9, 1992

[30] Foreign Application Priority Data

Dec. 19, 1990 [CA] Canada .................. 2032729

[51] Int. Cl.6 ............................. F16L 17/06
[52] U.S. Cl. ......................... 285/374; 285/423; 285/915
[58] Field of Search ............ 285/903, 423, 374, 351, 285/915

[56] References Cited

U.S. PATENT DOCUMENTS 4,362,187 12/1982 Harris et al. ............ 285/903 X
4,735,444 4/1988 Skipper .................. 285/351 X
4,865,362 9/1989 Holden ................... 285/903 X
4,913,473 4/1990 Bonnema et al. ......... 285/903 X
5,071,173 12/1991 Hegler et al. ........... 285/903 X

FOREIGN PATENT DOCUMENTS 385465 9/1990 European Pat. Off. .
410339 1/1991 European Pat. Off. .
3027866 3/1982 Germany .

Primary Examiner—Dave W. Arola
Attorney, Agent, or Firm—Brooks & Kushman

[57] ABSTRACT

Lengths of ribbed tube (10) having ribs which upstand appreciably from the main body of the tube may be coupled together using novel coupling ends (12, 112 and 14, 114, 214) of the tube. Alternatively, such ribbed tube may be coupled to plain walled tube (100). The lengths of tube are provided with first and second cuffed ends, the first end being a smooth walled cuff having a cuff having only shallow ribs reduced height and the second end being belled to couple with a first end of another tube or with plain walled tube smooth first end and the billed second end may be formed to respective outer and inner diameters for good sealing between them.

3 Claims, 8 Drawing Sheets

COUPLING FOR RIBBED PIPE

The invention relates to semi-rigid plastics material tube having a ribbed outer surface and having ends adapted to couple one tube to another.

BACKGROUND ART

Thermoplastic, semi-rigid tube has a variety of uses such as for underground drainage or for carrying electrical wiring. For various applications it has been found that corrugated tube, either double walled or single walled has advantages and, more recently, the use of a ribbed wall tube has become widespread. The ribs of such tube are usually annular or helical ribs upstanding from the tube wall by a height appreciably in excess of the thickness of the tube. The use of such ribbed tube gives good compression strength in comparison with solid walled tubes but utilizing less weight than plastics materials.

Ribbed tube has significantly larger outside diameter than plan walled tube and if they are to be joined together, coupling members of large internal diameter are generally unsuitable for joining ribbed tube with plain walled tube. For joining ribbed tubes, it is necessary to provide sealing means which must fill the entire gap between the ribbed tube base wall and the coupling sleeve. If the ribs upstand to any great degree this gap may be extensive. For example, if ribs upstand from the base wall of the tube by 2.5 cm or more, the seal must effectively seal an annular gap of at least 2.5 cm in width. When the ribs are annular, the seal may be located between two ribs.

A coupling sleeve may be provided as an independent unit or it may be provided by an expanded or belled end of one tube which fits over the end of another tube. In either case difficulties arise in accurate fit and sealing. Moreover, when the coupling sleeve is a belled end of one tube, the degree of belling has to be very large in order to fit over the ribs of the other tube. Further problems arise when it is desired to couple ribbed tube and plain walled tube together. It may be seen that, if ribbed tube of large outside diameter is to be joined to plain walled or other tube of small outside diameter, then there is a very large gap to be sealed between the two tubes. Generally, coupling between plain walled tube and ribbed tube is not carried out because of the difficulties involved. However, where it cannot be avoided, it has been found necessary to use independent coupling sleeves for the purpose. One reason for this is that bells provided in the ends of tubes to fit over ends of adjacent tubes must be sufficiently large to fit over ribbed tube. Thus, the gap presented between plain walled tube and the large coupling bell at the end of ribbed tube is too large to be sealed by conventional sealing means.

Ribbed tube of the type having substantially raised ribs is usually made by means of apparatus of the travelling mold tunnel type. A tubular parison of plastics material is extruded from an extrusion nozzle into a travelling mold tunnel over a forming plug. The forming plug defines the inner tube surface and the travelling mold tunnel defines the outer tube surface. Thus, the parison is forced into the cavity between the plug and the tubular tunnel which moves axially over the plug. The tubular tunnel has a mold surface to form the ribs or other configuration on the final tube. There are various means of providing such a travelling mold tunnel but this is often comprised by two tracks of mold blocks which come together in cooperating pairs to form a tunnel on a forwardly moving run parallel and coaxial with the extrusion nozzle.

It is known to introduce at least one pair of mold blocks, known as cuff blocks, adapted to mold a cuff of different outer surface of the tube into the mechanism of the travelling mold tunnel so that such different surface will be cyclically introduced on the surface of the molded tube according to the length of the runs of mold blocks. Of course such differing pairs of mold blocks may be inserted into the mold train at whatever intervals are desired. Thus, more than one such pair may be present in the runs.

For example, European patent application No. 0,385,465 discloses a double-walled corrugated tube comprising a smooth inner tube and a corrugated outer tube. The outer tube and the inner tube are co-extruded and are connected to each other by thermal welding. The corrugated outer tube is made by means of an apparatus of the travelling mold tunnel type. Smooth walled mold blocks are introduced in the mold tunnel, in order to get tube sections with a smooth outer surface. The tube is cut off in the middle of the smooth walled portions so that they form the ends of the tube. One end is belled as long as the tube is warm, in order to fit to the other end of a second tube for forming a coupling.

On the other hand this document also discloses a corrugated outer tube and smooth inner tube one end portion of which is belled. Due to the expansion of the bell the corrugations of this portion of the tube is flattened. At the other end of the tube the corrugations are also flattened without changing the inner diameter of the inner tube. The flattening of the corrugations at the other end portion is necessary for reducing the outer diameter of the outer tube in order to adapt it to a standard size. The flattening is obtained for instance by heat-forming.

European patent application No. 0,291,136 discloses a thermoplastics material tube having solid ribs upstanding from an outer base wall surface, the ribs being of a height at least as great as the wall thickness of the tube, the tube having ends formed as co-operating smooth walled spigots and sockets for joining lengths of tubes together. The smooth portions of the tube are also formed by smooth walled mold blocks which are introduced in the travelling mold tunnel at the desired locations.

The forming of such a tube by an injection molding process however leads to the following difficulties. It is not known to have been possible to make smooth walled tube in a travelling mold tunnel due to transport difficulties of the parison of the mold. It has been so well known that a travelling mold tunnel tends to slip with respect to the tube being molding in it, that it is generally regarded in the industry that molding smooth walled tube in a travelling mold tunnel is not possible. Even the manufacture of relatively short sections of smooth walled tube in an otherwise ribbed tube which is formed in an travelling mold tunnel is believed to give difficulty due to transport difficulty of the smooth walled section, which is known to affect the quality of the resulting plastic.

The present inventor has tried to overcome this long-standing problem and to provide an essentially smooth walled coupling portion in a travelling mold tunnel without affecting the quality of the resulting plastic.

According to the invention there is provided a thermoplastics material tube having solid ribs upstanding from an outer base wall surface, the ribs being of a height at least as great as the wall thickness of the tube, the tube having a first end and a second end, the first end comprising a short length of tube in which the ribs are of reduced height less than the wall thickness of the tube and define a groove for seating a sealing ring and the second end being belled sufficiently to fit over the first end of another tube. Preferably the second end has an inner annular groove adapted to engage a sealing ring.

A sealing ring for sealing between the first end of one tube and a second end of another tube may be provided in said inner annular groove.

The ribs may be of any configuration but it is envisaged that the invention will be of practical use with either of annulary ribbed and helically ribbed tube.

Also according to the invention there is provided a method of coupling one ribbed tube with another ribbed tube, each tube having ribs of a height greater than the wall thickness of the tube, comprising forming an end of reduced rib height less than the wall thickness of the tube in said one ribbed tube, seating a sealing ring located in a groove there between forming a belled end in the other ribbed tube, the diameter of the belled section being such that the bell section fits over an end of reduced height of said one ribbed tube, and fitting the belled section over said end of ribbed tube height.

Preferably the method includes forming an annular groove in an inner wall of the belled section locating a sealing ring in the groove.

Embodiments of the invention will now be described by way of example with reference to the accompanying drawings in which.

Figure 1:
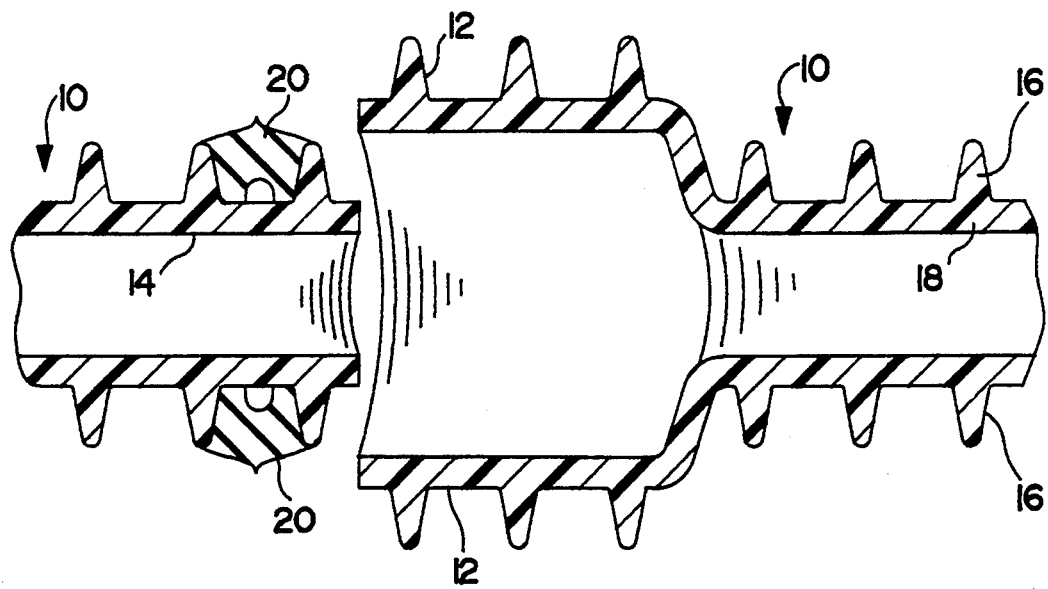
FIG. 1 is a sketch showing a prior art coupling between two ribbed tubes.

FIG. 1 shows a conventional coupling between the ends of two ribbed tubes. The coupling comprises a male/female connection between adjacent ends of tubes. For this purpose, one end 12 of each tube 10 is belled so that it will fit over the other end 14 of another tube 10. It is necessary for the belled end 12 to be expanded by at least the depth of the ribs 16 which are annular around the tube and which have a height, in this example, of approximately 4 times the thickness of the base wall 18 of the tube 10.

It is normally necessary to form the belled end 12 as a secondary operation after the length of the tube has been manufactured. While it may, at least theoretically, be possible to form blocks in a travelling mold tunnel, the depth of a bell may not be practicable in a travelling mold tunnel which travels over a forming plug to provide a mold cavity into which extrudate must be forced to form the tube. While pneumatic pressure may be used at intervals to make slight indentations in the internal surface of a tube formed in this manner, it is probably not practicable to use it for a bell of this size.

The other end of tube 10, as exemplified by the coupled end of the adjacent tube 10 in FIG. 1, is provided with an annular sealing ring 20 located between two adjacent ribs 16.

While the tube shown in FIG. 1 is representative of the invention in proportion and is not exaggerated in any way, it is to be noted that the tubes embodying the invention may have ribs of considerably lesser height than shown. Similarly the ribs may be of greater height than shown.

Figure 2:
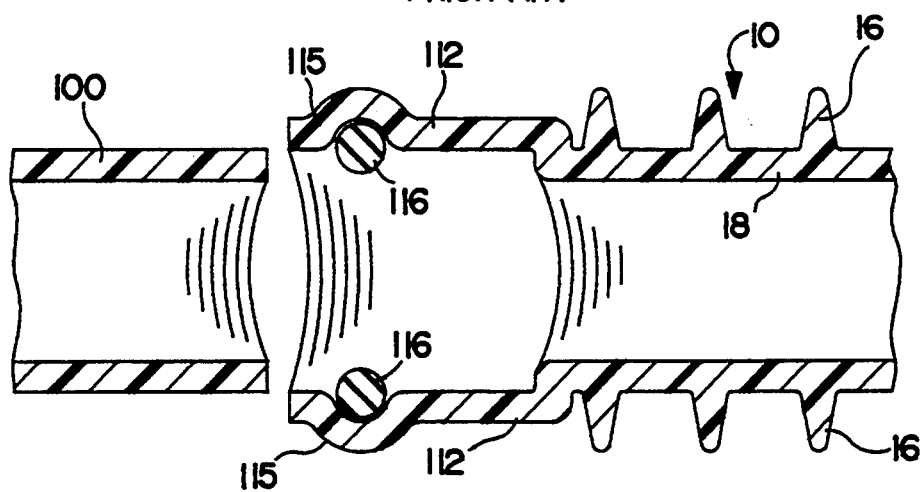
FIG. 2 is a sketch of one embodiment of a coupling between a ribbed tube and a plain tube according to the invention.
Figure 3:
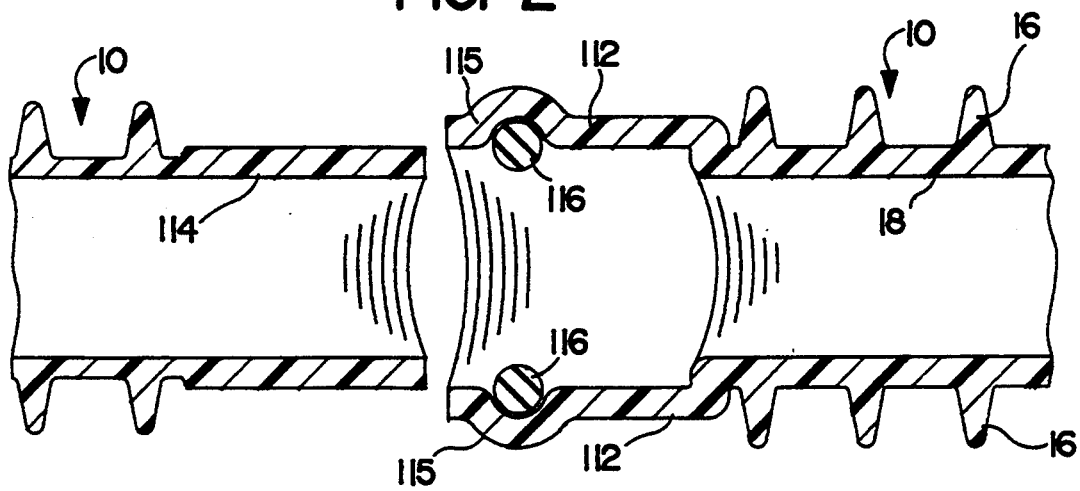
FIG. 3 is a sketch of another embodiment of a coupling between ribbed tubes according to the invention.

FIGS. 2 and 3 illustrate embodiments of the invention. Similar reference numbers to those used in FIG. 1 are also used in FIGS. 2 and 3 to indicate similar or comparative parts.

FIG. 2 illustrates a coupling between two ribbed tubes 10, one of which has a special coupling bell 112 at one end. The coupling bell is an extension of the tube which is only very slightly belled so that the end of tube 10 may be slid over the adjacent end of tube 100. The bell 112 includes an annular groove 115 in which may be located a standard sealing ring 116 for sealing with the other tube.

Figure 8:
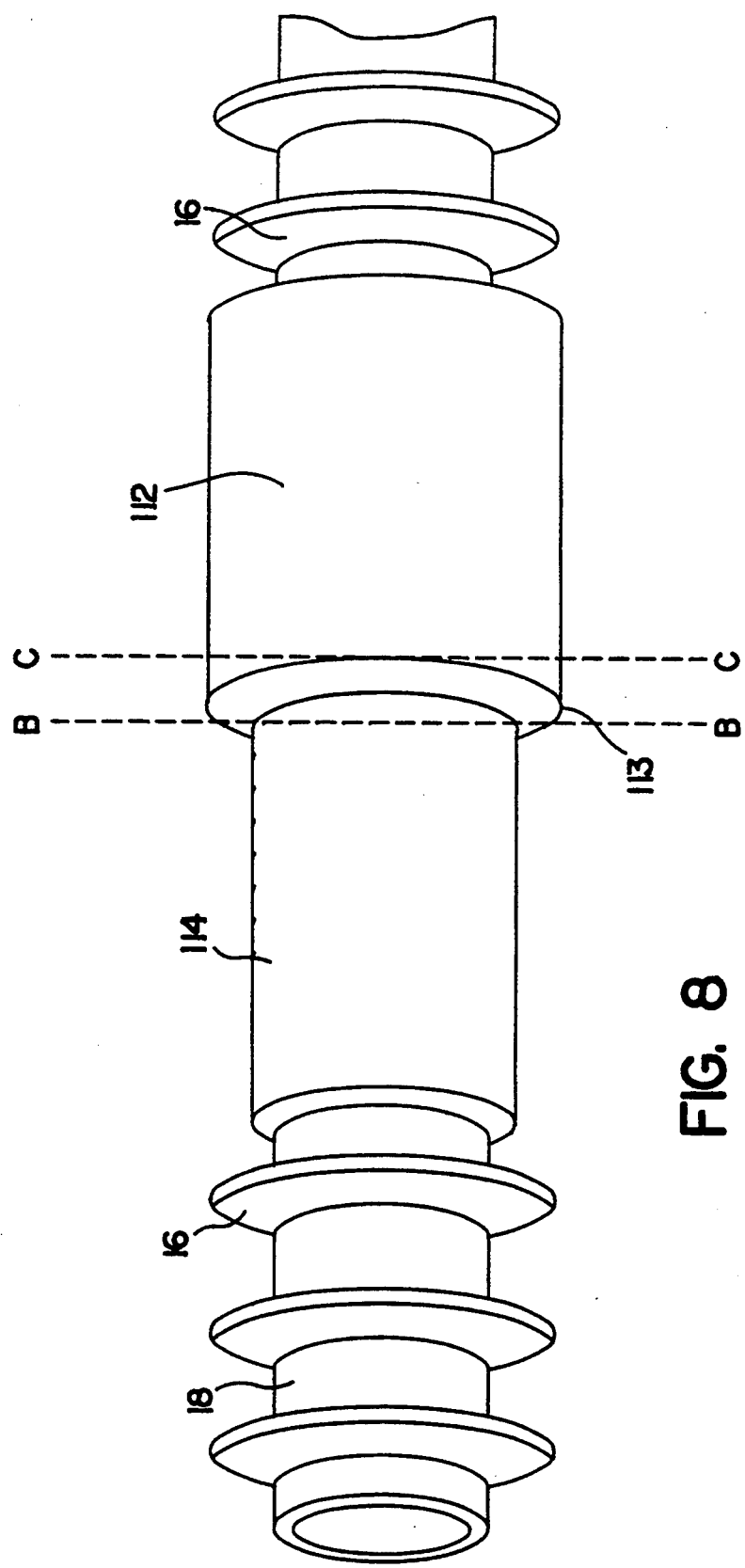
FIG. 8 is a sketch of another embodiment of a coupling.
Figure 9:
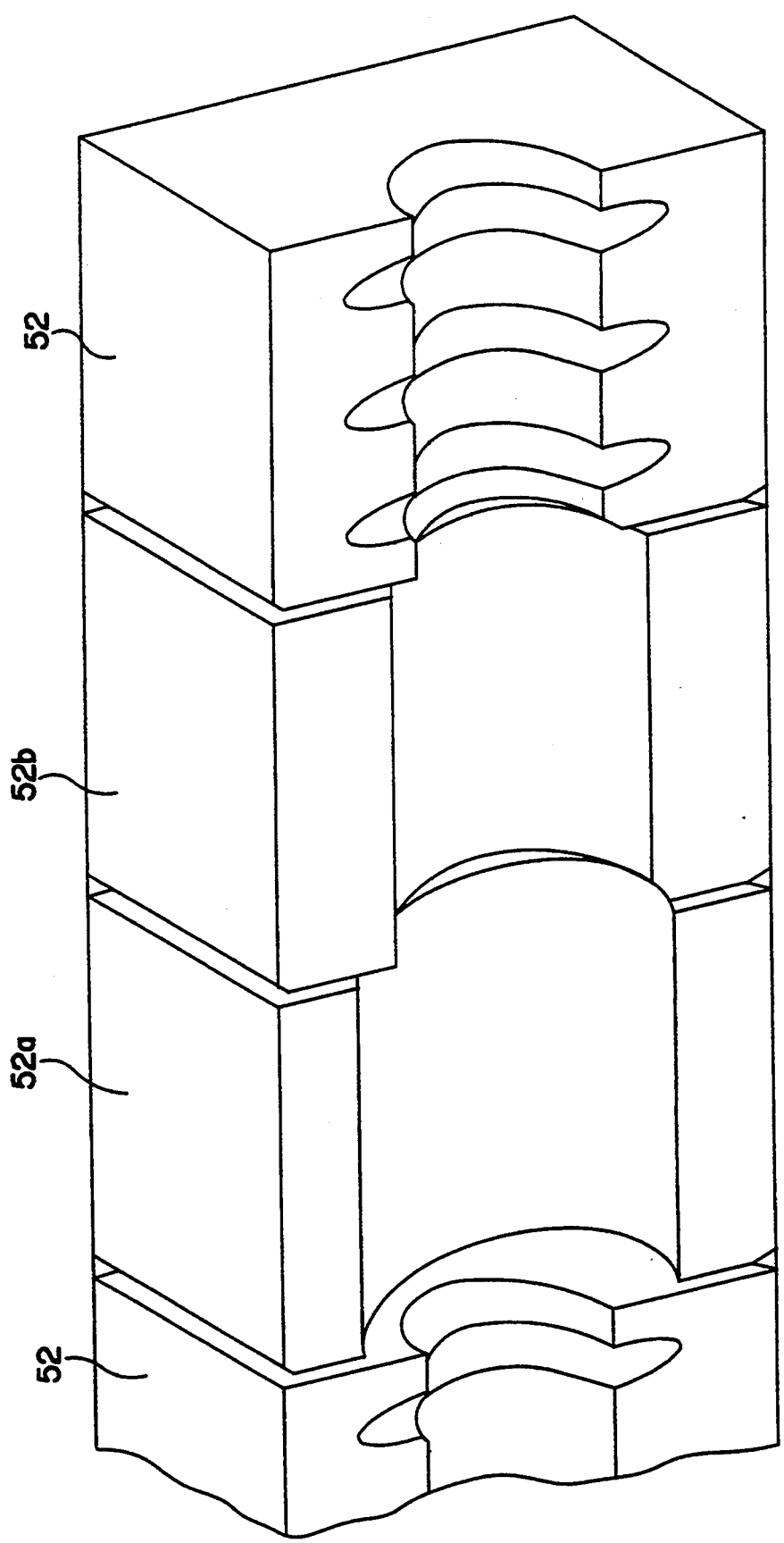
FIG. 9 is a sketch of an embodiment of another coupling.
Figure 10:
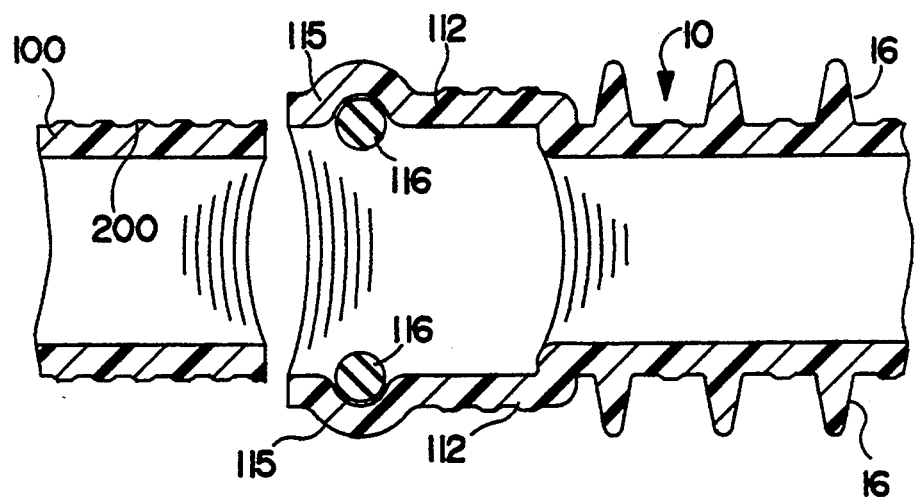
FIG. 10 is a sketch of tube having essentially smooth walled spigot and socket sections with traction ridges.
Figure 11:
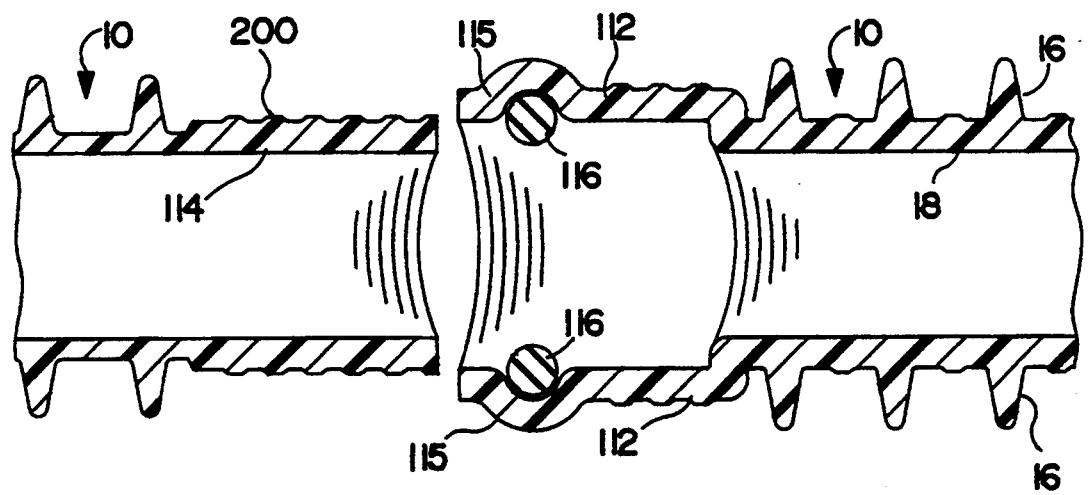
FIG. 11 is an enlargement of a detail of mold blocks of FIG. 4 for having transport grooves for forming transport ridges.
Figure 12:
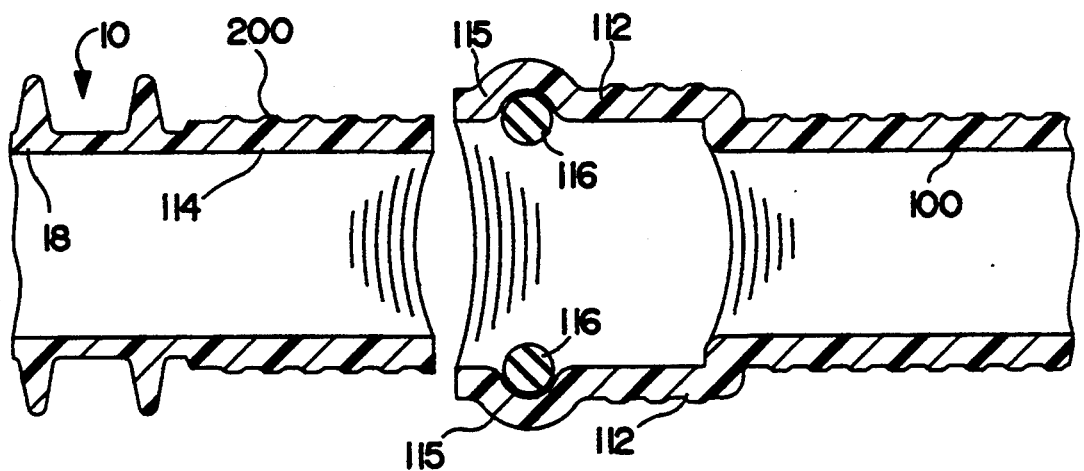
FIG. 12 is an embodiment of a coupling modified from that of FIG. 6.
Figure 13:
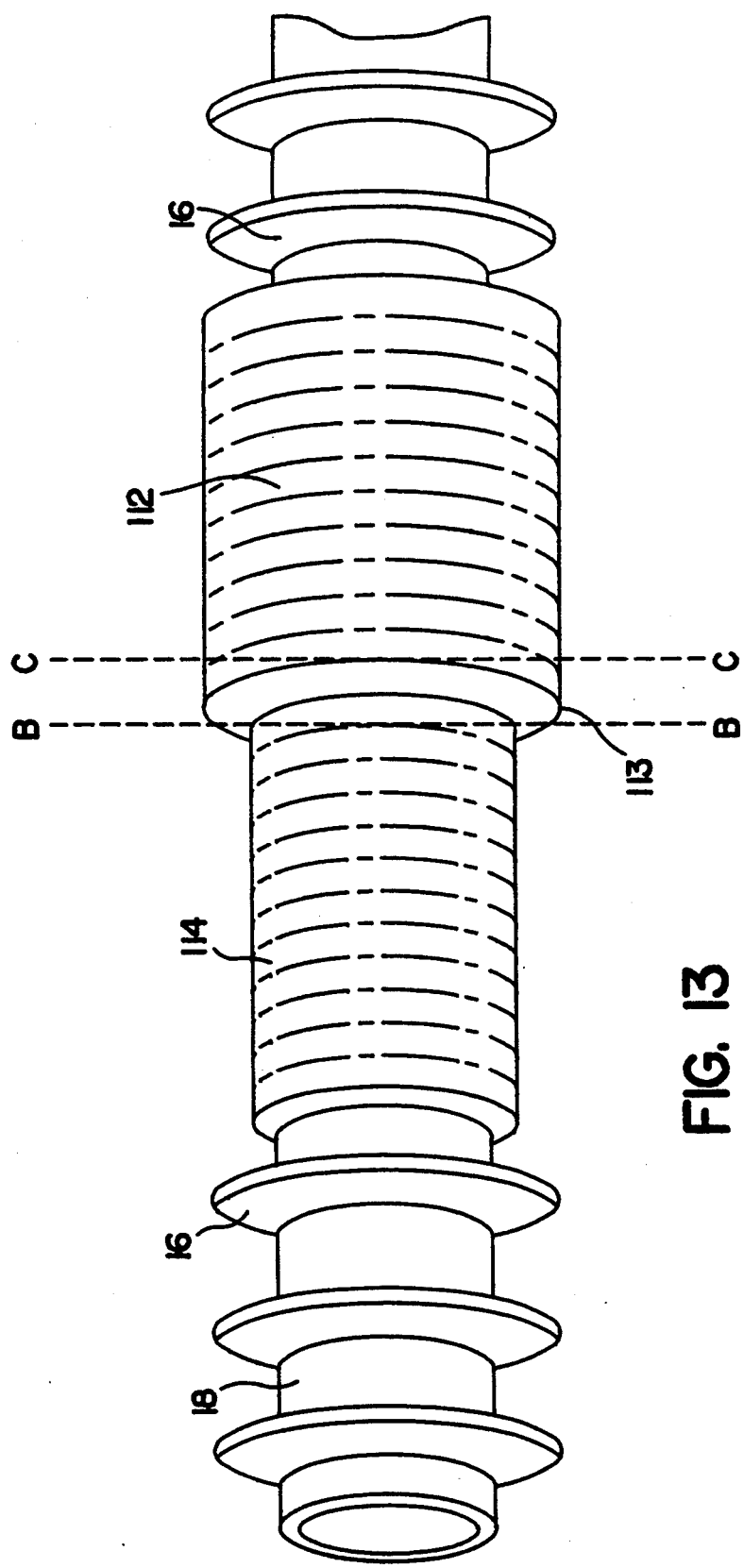
FIG. 13 is a sketch of a tube having essentially smooth walled spigot and socket sections with traction ridges.

The belled end 112 of tube 10 may be made in any convenient manner. One such manner is to cut a length of a plain sections 114. The end of this tube may be belled in a belling machine of conventional type. Alternatively, since the bell 112 is of slight depth, it may be formed in the original molding of the rib tube 10. It is necessary to provide a plain wall of an outer diameter greater than that of base wall 18. Such mold blocks are hereinafter described with reference to FIGS. 7, 8 and 9. Moreover, it is necessary to bias the extrudate away from the wall of the inner forming plug so that the inner surface of the belled end 112 is of greater diameter than the inner surface of base wall 18. This may be done in various manners, as for example by the use of pneumatic pressure or by mechanical means.

The other end 114 is easier to mold in a travelling mold tunnel than is the bell 112. All that it is required is the provision of mold blocks which are configured from plain wall tube rather than from rib wall tube. However, improvements in traction of such sections may be achieved by the rib roots 216. The end 214 may be of greater outer diameter to match the ends of tube to be joined. The end portion 214 may be thickened rather than belled for matching of outside diameters of tubes to be coupled. However, slight belling of this end might be an alternative manner of matching tubes. Thickening of end 214 may be achieved by momentary slowing of the travelling mold tunnel so that more plastics material is laid down in the mold. This may be achieved by adapting the shape of special mold blocks.

FIG. 2 shows an embodiment of tube 10 having belled end 112 coupled with a further tube 10. The end 214 of the further tube 10 is provided with rib roots 216. These rib roots 216 may be of a height to correspond with the outside diameter of tube to be joined and may be provided by special mold blocks configured to produce them or may be the result of cutting away original rib 16. Whatever the manner of their manufacture, these rib roots 216 may provide additional useful sealing means. The groove between two adjacent rib roots 216 may be used to house an additional sealing ring 118. Alternatively, as shown in FIG. 3, the groove between adjacent rib roots 216 may act as a container for glue which, through capillary action, will contact the inner surface of belled portion 112 when tubes 10 are coupled. Glue may also be applied between the tubes to be coupled at the ends of the rib roots 216. An intermediate smooth shave 215 may be applied over rib roots 216.

Figure 4:
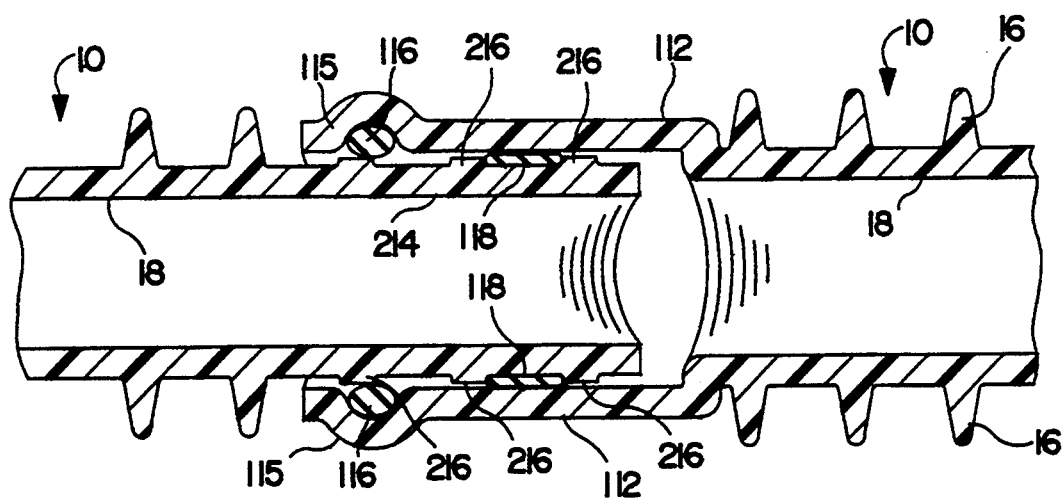
FIG. 4 is a longitudinal section through a travelling mold tunnel suitable for forming ribbed tubes having a coupling portion.

FIG. 4 illustrates a travelling mold tunnel 50 advancing in the direction of arrow A. The mold tunnel consists of two sets of mold blocks 52 circulating on the respective paths as described, for example, in U.S. Pat. No. 4,226,580, issued to Gerd Lupke et al on Oct. 7, 1980 or, indeed, as illustrated by any other of numerous conventional travelling mold tunnel apparatus. The travelling mold tunnel is frequently provided by means of cooperating runs of half mold blocks but it will be appreciated that the manner in which the tunnel is formed is not relevant to the present invention. The more important features concern the configuration of the mold blocks 52 in the region of forming tube ends.

The mold tunnel 50, in association with an extrusion die 54 provides an annular orifice for extruding outer tube into the mold cavity 60 of the mold tunnel 50.

The die may also be provided with the central core tube 66. Pressurized air may be supplied through a tube 67 running along the core tube 66 and a radial passage 68 to a chamber 70 inside the outer tube 58. This high pressure air may serve to blow mold the tube into the mold cavity 60 in the region of mold blocks 52a to form the belled end 112 of a tube length. Alternatively, a bell may be produced by the apparatus described and claimed in U.S. Pat. No. 4,226,580.

Thus, the mold blocks 52a are shaped to form the tube 58 into a bell. Mold blocks 52a are shown as providing an enlarged diameter, smooth wall, bell section 62 of the mold cavity 60. The tube 58 is molded into this bell section to 52b are provided to mold tube end portion 114. The mold block 52b may provide a shallowed bell, i.e. one having a smaller outside diameter, than that of tube end portion 112. However, unless means such as pneumatic pressure are provided to force extrudate away from the cooling plug 72, a thickened portion 114 will be formed. To promote suitable thickness of this portion, it may be possible to show the travel of mold tunnel 50 while mold blocks 52b pass the exit of extrusion die 54.

Figure 5:
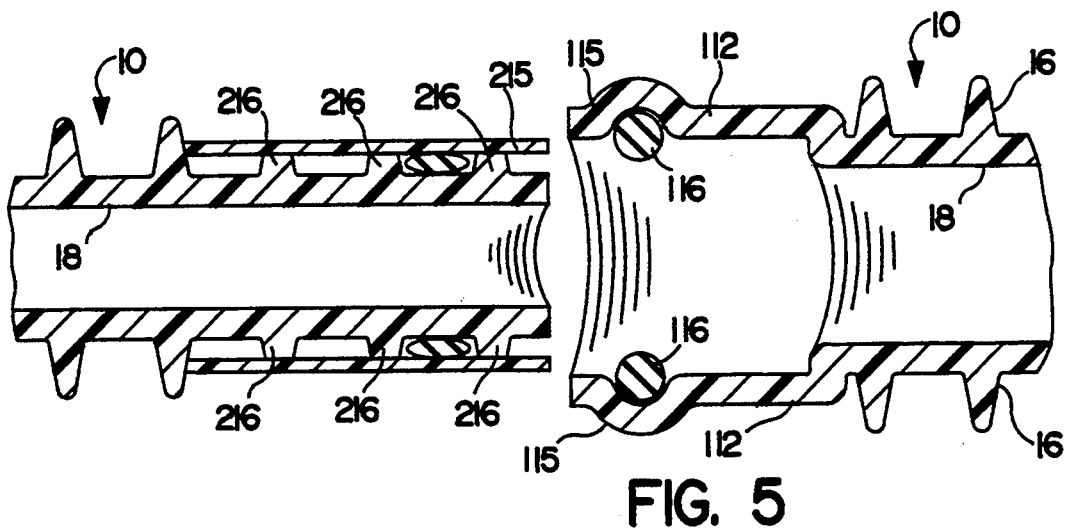
FIG. 5 is a sketch of tube produced from apparatus as shown in FIG. 4 before separation into its components parts.

FIG. 5 shows tube obtained, for example from apparatus as described in connection with FIG. 7. The end portions 112, 114, are connected by a web 113. It is easy to separate this continuous tube into component lengths by removal of web 113. Such removal may be by a slight cut or by two parallel cuts 6 as indicated by phantom lines B and C.

Figure 6:
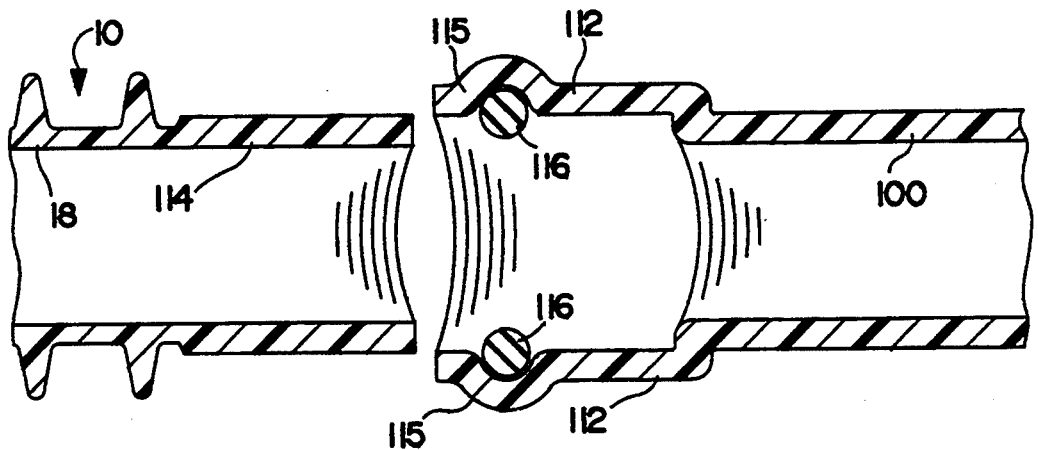
FIG. 6 is an enlargement of a detail of the mold blocks for molding a coupling end of the tube in apparatus as shown in FIG. 4.
Figure 7:
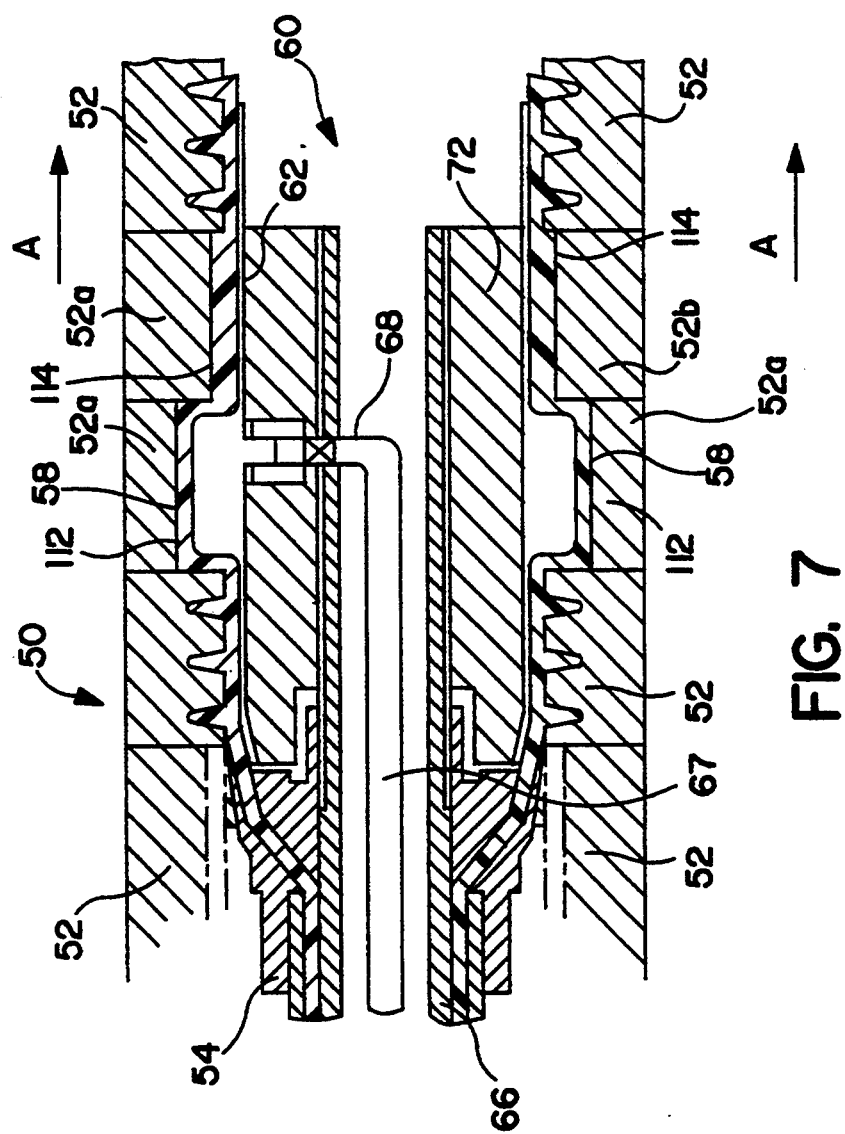
FIG. 7 is a sketch of an embodiment of a coupling.

FIG. 6 shows in more detail one longitudinal half of the mold surface such as that of FIG. 7.

Figure 14:
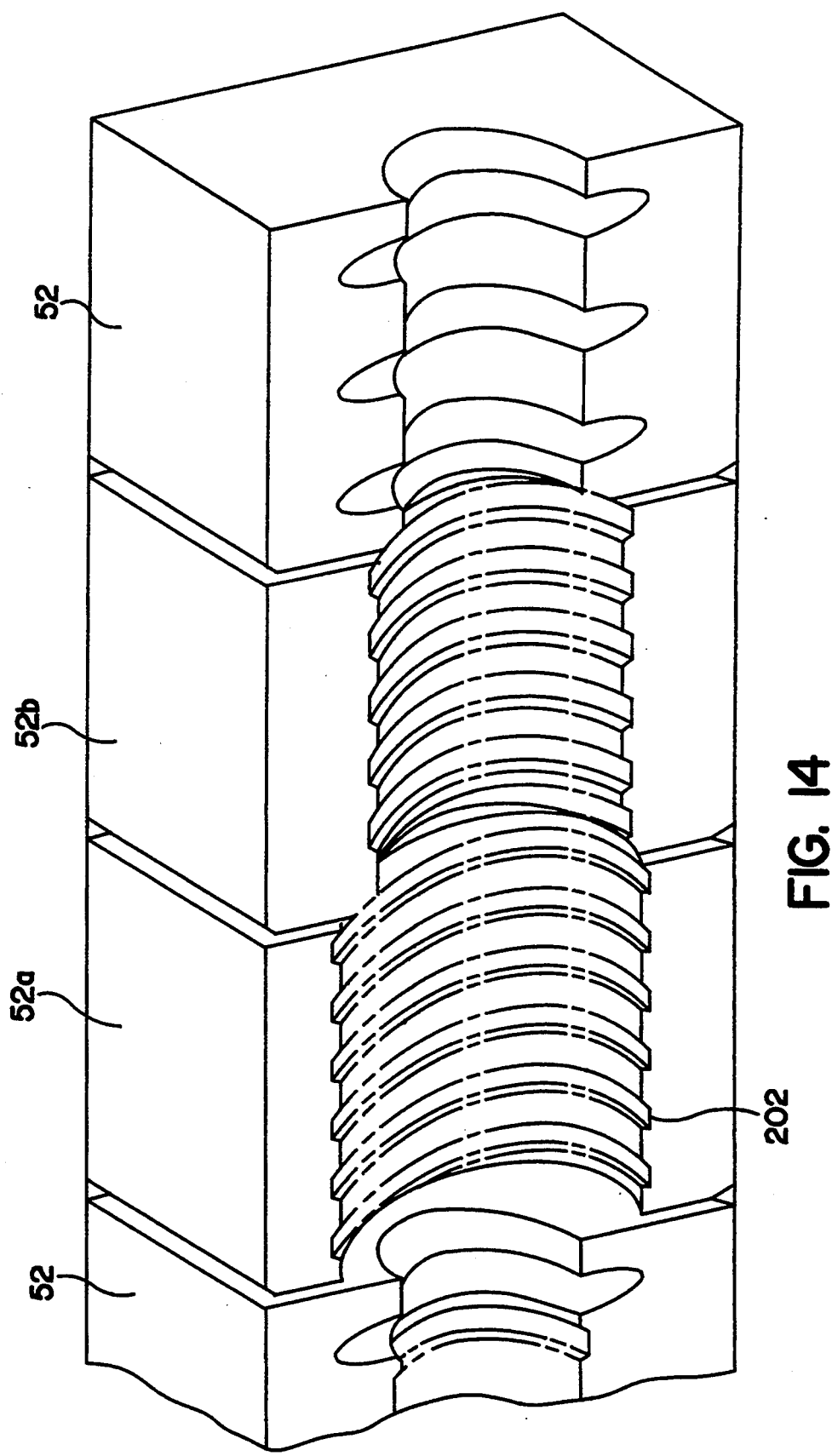
FIG. 14 is an enlargement of a detail of mold blocks of FIG. 7 having transport grooves for forming transport ridges.

FIGS. 7–9, 10 and 11 illustrate couplings and apparatus for making the couplings, in which coupling portions are, whether belled or unbelled, essentially similar. A thickened spigot section or a smooth walled tube, provided with traction ridges 200 (or in the case of FIG. 14, traction grooves 202) which may be of rectangular corrugated or sine wave corrugated or any other suitable configuration. In particular, the smooth walled sections may be made by the apparatus and method as claimed in PCT Patent application No. PCT/CA91/00214 by Manfred Lupke filed on even date herewith and entitled Smooth Walled Tube Formed in a Travelling Mold Tunnel.

I claim:

1. A thermoplastics material tube having solid ribs (16) upstanding from an annular base wall surface having a first end and a second end, the first end comprising a short length of tube devoid of said ribs and provided with a traction surface and said second end being belled sufficiently to fit over said first end of another tube, said belled end being provided with an outwardly bowed wall section forming an inner annular groove in said belled end adapted to engage a sealing ring.

2. Tube as claimed in claim 1 in which the ribs (16) are annular ribs.

3. Tube as claimed in claim 1 in which the ribs (16) are helical ribs.

* * * * *